United States Patent [19]

Akiyama et al.

[11] Patent Number: 4,701,372
[45] Date of Patent: Oct. 20, 1987

[54] MAGNETIC RECORDING MEDIUM

[75] Inventors: Takashi Akiyama; Yasunari Hotta; Naonobu Oda, all of Shiga, Japan

[73] Assignee: Toyo Boseki Kabushiki Kaisha, Osaka, Japan

[21] Appl. No.: 905,219

[22] Filed: Sep. 9, 1986

[30] Foreign Application Priority Data

Sep. 18, 1985 [JP] Japan .................................. 60-207139
Sep. 20, 1985 [JP] Japan .................................. 60-209676

[51] Int. Cl.$^4$ ............................................. G11B 5/68
[52] U.S. Cl. .................................... 428/323; 428/323; 428/328; 428/329; 428/425.9; 428/694; 428/695; 428/900
[58] Field of Search ................... 428/425.9, 329, 328, 428/695, 694, 900, 64, 65, 323; 252/62.54; 427/128

[56] References Cited

U.S. PATENT DOCUMENTS

| 4,152,485 | 5/1979 | Mizumura et al. | 428/900 |
| 4,425,401 | 1/1984 | Ido et al. | 428/900 |
| 4,511,617 | 4/1985 | Hideyama | 428/694 |
| 4,521,486 | 6/1985 | Ninomiya | 428/329 |
| 4,529,661 | 7/1985 | Ninomiya | 428/329 |
| 4,565,726 | 1/1986 | Oguchi | 428/329 |
| 4,585,697 | 4/1986 | Kato | 428/407 |
| 4,600,521 | 7/1986 | Nakamura | 428/694 |
| 4,606,971 | 8/1986 | Ido | 428/329 |
| 4,613,545 | 9/1986 | Chubachi | 428/329 |
| 4,615,949 | 10/1986 | Yoda | 428/329 |
| 4,634,633 | 1/1987 | Ninomiya | 428/694 |
| 4,637,959 | 1/1987 | Ninomiya | 428/694 |
| 4,656,089 | 4/1987 | Ninomiya | 428/694 |

Primary Examiner—Ellis P. Robinson
Attorney, Agent, or Firm—Barnes & Thornburg

[57] ABSTRACT

A magnetic recording medium characterized by a magnetic layer comprising (A) magnetic fine particles of plate-like hexagonal ferrite having a particle size of 0.3 microns or less and an easily magnetizable axis in the direction vertical to the flat plate surface (B) a polyurethane resin having a metal sulfonate group and (C) one or more esters of $C_{10}$–$C_{18}$ fatty acids with alcohols having not more than 15 carbon atoms.

4 Claims, No Drawings

MAGNETIC RECORDING MEDIUM

The present invention relates to a magnetic recording medium produced with hexagonal ferrite as a magnetic material in which the surface of coating film (magnetic layer) is superior in smoothness, particularly the friction coefficient of the surface is low and changes little over a wide range of temperatures and humidities, and besides the abrasion resistance and durability are excellent. Particularly, the present invention relates to a flexible and disc-like magnetic recording medium.

Hitherto, recording and reproduction on magnetic recording media are generally carried out by magnetization in a direction parallel to the surface of the media. For specific examples of the magnetic body, there are given $\gamma\text{-Fe}_2\text{O}_3$, $\text{CrO}_2$, cobalt ferrite ($\text{CrO}_2\cdot\text{Fe}_2\text{O}_3$), iron oxide containing adsorbed cobalt, etc. With magnetic recording media containing these magnetic bodies, when high-density recording is tried by increasing the recording frequency to shorten the wave length, there appears a reduction in the reproduced output by a demagnetization action, the magnetic recording media becoming fundamentally unsuitable for use in high-density recording. On the other hand, when magnetic hexagonal ferrite powders, particularly, in the form of a flat plate having an easily magnetizable axis in the direction vertical to its surface are used, magnetization in the direction vertical to the surface of magnetic recording media becomes possible, so that the demagnetization action is difficult to occur, and besides high-density recording is possible by the use of common ring heads.

In the prior-art methods (longitudinal magnetization), it was difficult to obtain magnetic recording media superior in both dispersibility of magnetic fine powders and durability. Similarly, dispersion of fine and flat plate-like substances like the plate-like hexagonal ferrite used in the novel method (vertical magnetization) is more difficult, and when the dispersibility is improved, there appear a reduction in the strength of coating film as well as blooming and adhesiveness at elevated temperatures. Consequently, magnetic recording media having smooth surface and good durability are not yet obtained.

When flat plate-like fine magnetic powders are used, uniform dispersion of the powders by the use of the generally known polyurethane resins, epoxy resins, nitrocellulose, vinyl chloride/vinyl acetate copolymers, polyester resins, etc. is very difficult. This not only causes a very rough surface, a great loss in the reproduction of short wave lengths on a ring head and a great hindrance to high-density recording, but also lowers abrasion resistance and durability. Consequently, a method of adding dispersing agents such as surface active agents, etc. has been used. With this method, however, dispersion of plate-like hexagonal ferrite fine particles of 0.3 μm or less in particle size is not only insufficient, but addition of surface active agents weakens adhesion of the magnetic layer to the non-magnetic substrate and as a result, causes the coating film (magnetic layer) to peel off upon long-term driving.

Previously, we invented a binder superior in the dispersion of magnetic powders as well as adhesion force to non-magnetic substrates (Japanese Patent Application No. 66459/1978). When, however, the plate-like hexagonal ferrite fine particles of the present invention having a particle size of 0.3 μm or less are used, the invention above gave only magnetic recording media which are poor in abrasion resistance and durability, because dispersion of the fine powders in the binder is insufficient.

The present inventors extensively studied to obtain magnetic recording media having a magnetic layer which is suitable for high-density recording, has a smooth surface and a friction coefficient which is low and changes little over a wide range of temperatures and humidities, and besides which is superior in abrasion resistance and durability. As a result, the present inventors solved the foregoing problems and succeeded in obtaining magnetic recording media using fine magnetic powders of plate-like hexagonal ferrite which are suitable for high-density recording and have excellent surface smoothness and a friction coefficient which is low and changes little over a wide range of temperatures and humidities as well as excellent abrasion resistance and durability.

The present invention provides a magnetic recording medium characterized in that a magnetic layer containing (A) magnetic fine particles of plate-like hexagonal ferrite having a particle size of 0.3 μm or less and an easily magnetizable axis in the direction vertical to the flat plate surface, (B) a polyurethane resin having a metal sulfonate group of 20 to 500 equivalents/$10^6$ g of the polymer and (C) one or more members selected from the esters of $\text{C}_{10}\text{-C}_{18}$ fatty acids with alcohols having not more than 15 carbon atoms, the ratio of (C) to (A) being 0.1 to 20 wt. %, is applied to a non-magnetic substrate.

Plate-like hexagonal ferrite used in the present invention is represented by the general formula, $\text{AFe}_{12-x}\text{M}_x\text{O}_{19}$ in which A represents Ba, Sr, Pb or Ca, M represents Co, Ti, Ni, Mn or Nb, and x represents 0 to 2.5, and it has an easily magnetizable axis in the direction vertical to the flat plate surface and a particle size of 0.3 μm or less. Hexagonal ferrite having a particle size of larger than 0.3 μm is not only poor in medium noise but also unsuitable for high-density recording.

It suffices for the polyurethane resin used in the present invention to contain a metal sulfonate group of 20 to 500 equivalents/ $10^6$ g of the polymer. When the content of the metal sulfonate group is less than 20 equivalents/$10^6$ g of the polymer, no increase in the Br/Bm ratio can not only be expected, but high-density packing of magnetic particles cannot also be attained. When the content of the metal sulfonate group exceeds 500 equivalents/$10^6$ g of the polymer, the polyurethane resin becomes poor in solubility in solvents, lacking a practical value.

The polyurethane resin of the present invention is obtained by the reaction of a polyhydroxy compound with polyisocyanate, in which case a part or all of the polyhydroxy compound used contain a metal sulfonate group.

A particularly preferred example of the polyhydroxy compound having a metal sulfonate group is a polyester polyol having a metal sulfonate group which comprises a carboxylic acid component having no metal sulfonate group, a glycol component and a dicarboxylic acid component having a metal sulfonate group.

The carboxylic acid component having no metal sulfonate group includes aromatic dicarboxylic acids (e.g. terephthalic acid, isophthalic acid, orthophthalic acid, 1,5-naphthalic acid), aromatic oxycarboxylic acids [e.g. p-oxybenzoic acid, p-(hydroxyethoxy)benzoic acid], aliphatic dicarboxylic acids (e.g. succinic acid, adipic acid, azelaic acid, sebacic acid, dodecanedicarboxylic acid), and tri- or tetracarboxylic acids (e.g. trimellitic acid, trimesic acid, pyromellitic acid).

The glycol component includes ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, ethylene oxide and propylene oxide adducts of bisphenol A, ethylene oxide and propylene oxide adducts of hydrogenated bisphenol A, polyethylene glycol, polypropylene glycol, polytetramethylene glycol, etc. This glycol component may be used in combination with a tri- or tetraol (e.g. trimethylolethane, trimethylolpropane, glycerin, pentaerythritol).

The dicarboxylic acid component having a metal sulfonate group includes 5-sodium sulfoisophthalic acid, 5-potassium sulfoisophthalic acid, 2-sodium sulfoterephthalic acid, 2-potassium sulfoterephthalic acid, etc. The copolymerization amount of these dicarboxylic acid components having a metal sulfonate group is 0.5 mole % or more, preferably 1 to 50 mole % based on the total carboxylic acid components.

The foregoing polyhydroxy compounds having a metal sulfonate group may be used alone or in combination. These polyhydroxy compounds may be used together with a polyhydroxy compound having no metal sulfonate group, such as the common polyester polyols, polyether polyols or acryl polyols, derivatives of castor oil or tall oil and other hydroxy group-containing compounds.

The polyisocyanate used for the preparation of the polyurethane resin of the present invention includes 2,4-tolylenediisocyanate, 2,6-tolylenediisocyanate, p-phenylenediisocyanate, diphenylmethanediisocyanate, m-phenylenediisocyanate, hexamethylenediisocyanate, tetramethylenediisocyanate, 3,3'-dimethoxy-4,4'-biphenylenediisocyanate, 2,4-naphthalenediisocyanate, 3,3'-dimethyl-4,4'-biphenylenediisocyanate, 4,4'-diphenylenediisocyanate, 4,4'-diisocyanatediphenyl ether, 1,5-naphthalenediisocyanate, p-xylylenediisocyanate, m-xylylenediisocyanate, 1,3-diisocyanatemethylcyclohexane, 1,4-diisocyanatemethylcyclohexane, 4,4'-diisocyanatedicyclohexane, 4,4'-diisocyanatedicyclohexylmethane, isophoronediisocyanate, etc. If necessary, these polyisocyanates may be used together with small amounts of 2,4,4'-triisocyanatediphenyl, benzenetriisocyanate, etc.

The polyurethane resin is obtained by reacting a polyhydroxy compound with polyisocyanate with or without a solvent by the well-known method. Preferred mixing ratio of polyisocyanate to polyhydroxy compound is 0.5–2 to 1 as expressed by the ratio of the NCO group of polyisocyanate to the OH group of polyhydroxy compound. The molecular weight of the polyurethane resin obtained is preferably 8,000 to 100,000.

So far as the dispersibility of the plate-like fine particles of hexagonal ferrite and the object of the present invention are not damaged, to the polyurethane resin of the present invention may be added a resin compatible with it and/or a compound crosslinkable with it. The amount of such resin or compound added is generally 2 to 100 parts by weight based on 100 parts by weight of the polyurethane resin.

The resin compatible with the polyurethane resin includes polyvinyl chloride resins, polyester resins, cellulosic resins, etc. The compound crosslinkable with the polyurethane resin includes epoxy resins, isocyanate compounds, melamine resins, urea resins, polyol compounds, etc. Of these compounds, isocyanate compounds are particularly preferred.

Specific examples of the esters of $C_{10}$–$C_{18}$ fatty acids with alcohols having not more than 15 carbon atoms which act as a lubricant in the present invention include n-butyl stearate, octyl stearate, tridecyl stearate, n-butyl palmitate, n-butyl myristate, n-butyl laurate, n-decyl myristate, myristyl palmitate, ethyl n-nonadecylate, n-propyl laurate, etc. Of these esters, preferred ones are those obtained with straight-chain alcohols having 4 to 15 (both inclusive) carbon atoms, more preferred ones are those obtained with straight-chain saturated alcohols having 4 to 15 (both inclusive) carbon atoms, and particularly preferred ones are butylcellosolve stearate and butylcellosolve palmitate. These lubricants may be used alone or in mixture of two or more of them. The amount of the lubricant blended is preferably 0.1 to 20 wt. %, more preferably 0.1 to 10 wt. %, particularly preferably 1 to 7 wt. % based on the magnetic powders. When the amount is less than 0.1 wt. %, the intended effect is not obtained, while when the amount is larger than 20 wt. %, it sometimes occurs that blooming is generated at elevated temperatures to stain magnetic heads.

The details of a reason why the magnetic recording medium of the present invention is obtained when the foregoing particular lubricant is used in combination with the polyurethane resin having a metal sulfonate group of 20 to 500 equivalents/$10^6$ g of the polymer, are not clear. But the following may be considered: Because of good affinity and compatibility between the lubricant and polyurethane resin of the present invention, dispersion of the ferromagnetic fine particles of flat plate-like hexagonal ferrite becomes good and separation of the lubricant is inhibited by combining the lubricant and polyurethane resin, which is useful to obtain magnetic recording media for high-density recording. For incorporating the lubricant in the magnetic layer, there are methods such as a method of kneading the magnetic particles and the binder together, a method of dissolving the lubricant in a solvent, coating the resulting solution onto the magnetic layer and drying, a method of dipping the magnetic layer in said solution and drying, and combinations of these methods. These methods are properly selected as need arises.

Non-magnetic powders used in the present invention having a Mohs' hardness of 6 or more and a particle size of 1 $\mu$m or less include $TiO_2$, $SiO_2$, $Al_2O_3$, $Cr_2O_3$ and $\alpha$-$Fe_2O_3$. When the particle size is larger than 1 $\mu$m, the surface property becomes poor to make medium noise large, so that the particle size needs to be 1 $\mu$m or less. When the Mohs' hardness is less than 6, there is little effect to improve the abrasion resistance and durability of the surface.

These non-magnetic powders having a Mohs' hardness of 6 or more may be added alone or in mixture of two or more of them. The amount of the powders added is 2 to 20 wt. %, preferably 2 to 10 wt. % based on the magnetic powders. When the amount is less than 2 wt. %, the friction coefficient of the coating film is not sufficiently low, and satisfactory durability is not obtained. While when the amount is more than 20 wt. %, the durability surely improves, but, because the amount becomes too large relative to that of the magnetic powders, no sufficient output is not only obtained, but abrasion of the head sometimes occurs to cause a reduction in reproduced output. As described above, the present inventors found that magnetic recording media having excellent surface smoothness, a friction coefficient which is low and changes little over a wide range of temperatures and humidities and excellent durability can be obtained only when plate-like hexagonal ferrite particles having a particle size of 0.3 μm or less suitable for high-density recording are used in combination with the particular binder, particular lubricant and non-magnetic powders having a proper hardness. The non-magnetic substrate used in the present invention includes films, sheets, tapes, etc. comprising polymers such as polyethylene terephthalate, polyphenylene sulfide, polypropylene, cellulose diacetate, polyimide, polyamide, polycarbonate, polyvinyl chloride, etc. To these polymers may be added reinforcing agents, fillers, lubricants, etc.

Further, in order to raise the electroconductivity of the present magnetic recording medium, fine powders of carbon and/or graphite may be added. Also, in order to raise the stability of the present binder, antioxidants, etc. may be added.

The present invention will be illustrated with reference to the following examples, but it is not limited to these examples.

A continuous driving test was carried out by magnetic disc drive in an atmosphere controlling box, and output reduction (%) after the 3,000,000th passage was measured.

*: Magnetic layer peels off or driving stops by over torque.
**: Not measurable.
Void content (%):
Expressed by the vol. % of voids in the magnetic layer. Void Content = 1 − Ms/q.Mo
Ms: saturation magnetization of magnetic layer in unit volume.
q: Vol. % of magnetic powder to total volume of components composing magnetic layer.
Mo: saturation magnetization of magnetic powder in unit volume.
Dynamic friction coefficient:
Friction generated when a head load of 20 g was applied to a floppy disc which was being rotated at 300 rpm was detected and measured by means of a strain gauge.

TABLE 1

| No. | | Kind of polyurethane resin | Metal sulfonate group content of polyurethane resin (equivalents/10⁶ g) | Surface roughness Ra (μm) | Durability 5° C. | 45° C. |
|---|---|---|---|---|---|---|
| Example No. | 1 | a | 26 | 0.025 | 5 > | 7 |
| | 2 | b | 47 | 0.019 | 5> | 8 |
| | 3 | c | 150 | 0.018 | 5> | 7 |
| | 4 | d | 370 | 0.018 | 5> | 6 |
| | 5 | e | 500 | 0.020 | 7 | 12 |
| | 6 | a/c = 2/1 | — | 0.018 | 5> | 8 |
| | 7 | b/c = 1.2 | — | 0.019 | 5> | 8 |
| Comparative example No. | 1 | n | 0 | 0.039 | * | * |
| | 2 | m | 5 | 0.036 | * | * |
| | 3 | p | 1100 | ** | ** | ** |

EXAMPLES 1 TO 7 AND COMPARATIVE EXAMPLES 1 TO 3

| | Part by weight |
|---|---|
| Plate-like hexagonal ferrite (particle size, 0.2 μm) | 100 |
| Polyurethane resin (described in Table 1) | .20 |
| Nitrocellulose (a product of Daiseru Kagaku Kogyo Co.) | 5 |
| Al₂O₃ (Mohs' hardness, 9; particle size, 0.1 μm) | 6 |
| Carbon black (a product of Lion Akzo Co., Ltd.) | 4 |
| Coronate L (a product of Nippon Polyurethane Co.) | 5 |
| Methyl ethyl ketone | 200 |
| Toluene | 200 |
| n-Butyl stearate | 3 |

These materials were thoroughly milled together by means of a ball mill to prepare a magnetic paint. This paint was coated onto the both surfaces of a polyethylene terephthalate film of 75 μm in thickness so that the dry thickness was 1.5 μm, dried and hardened by allowing the film to stand at a temperature of 60° C. for 24 hours. Magnetic discs were then stamped out of the film and evaluated. The results are shown in Table 1.

The magnetic discs were evaluated by the following methods in the examples and comparative examples described later:

Surface roughness:
Measured on "Surfcom 300A" (a surface roughness meter, a product of Tokyo Seimitsu K.K.).

Durability:

EXAMPLES 8 TO 15 AND COMPARATIVE EXAMPLES 4 TO 7

Magnetic discs were prepared in the same manner as in Examples 1 to 7 except that the polyurethane resin (c) was used and compounds shown in Table 2 were used as a lubricant, and evaluated in the same manner as above. The results are shown in Table 2.

TABLE 2

| No. | | Lubricant | Surface roughness Ra (μm) | Durability 5° C. | 45° C. |
|---|---|---|---|---|---|
| Example No. | 8 | Octyl stearate | 0.018 | 3 | 8 |
| | 9 | Tridecyl stearate | 0.019 | 4 | 7 |
| | 10 | n-Butyl palmitate | 0.017 | 3 | 5 |
| | 11 | n-Butyl myristate | 0.018 | 3 | 6 |
| | 12 | n-Decyl myristate | 0.019 | 5 | 7 |
| | 13 | Myristyl palmitate | 0.020 | 4 | 6 |
| | 14 | n-Propyl laurate | 0.022 | 8 | 12 |
| | 15 | Ethyl n-nonadecylate | 0.024 | 10 | 15 |
| Comparative example No. | 4 | Cetyl stearate | 0.39 | * | * |
| | 5 | Stearyl stearate | 0.24 | * | * |
| | 6 | Methyl pelargonate | 0.041 | * | * |
| | 7 | Liquid paraffin | 0.062 | * | * |

EXAMPLES 16 TO 25 AND COMPARATIVE EXAMPLES 8 TO 15

Magnetic discs were prepared using polyurethane resins and lubricants shown in Table 3 according to the methods of Examples 1 to 7, and evaluated in the same manner as above. The results are shown in Table 3.

-continued

|  | Part by weight |
|---|---|
| n-Butylcellosolve palmitate | 3 |
| Methyl ethyl ketone | 120 |
| Toluene | 120 |
| Cyclohexane | 60 |

TABLE 3

| | No. | Polyurethane resin | Lubricant | Surface roughness Ra (μm) | Durability 5° C. | Durability 45° C. |
|---|---|---|---|---|---|---|
| Example No. | 16 | c | n-Butyl stearate/tridecyl stearate(1:1) | 0.018 | 5> | 8 |
| | 17 | | n-Butyl stearate/n-butyl palmitate(1:1) | 0.017 | 5> | 7 |
| | 18 | b | Octyl stearate | 0.019 | 5> | 8 |
| | 19 | | Tridecyl stearate | 0.018 | 5> | 7 |
| | 20 | | n-Butyl palmitate | 0.020 | 5> | 7 |
| | 21 | | n-Butyl myristate | 0.018 | 5> | 8 |
| | 22 | d | Octyl stearate | 0.016 | 5> | 9 |
| | 23 | | Tridecyl stearate | 0.017 | 5> | 8 |
| | 24 | | n-Butyl palmitate | 0.017 | 5> | 9 |
| | 25 | | n-Butyl myristate | 0.015 | 5> | 7 |
| Comparative example No. | 8 | b | Cetyl stearate | 0.29 | * | * |
| | 9 | | Stearyl stearate | 0.28 | * | * |
| | 10 | | Methyl pelargonate | 0.022 | * | * |
| | 11 | | Liquid paraffin | 0.070 | * | * |
| | 12 | d | Cetyl stearate | 0.32 | * | * |
| | 13 | | Stearyl stearate | 0.26 | * | * |
| | 14 | | Methyl pelargonate | 0.018 | * | * |
| | 15 | | Liquid paraffin | 0.053 | * | * |

EXAMPLES 26 TO 32 AND COMPARATIVE EXAMPLES 16 TO 19

| | Part by weight |
|---|---|
| Hexagonal barium ferrite (particle size, 0.08 μm) | 100 |
| Polyurethane resin (described in Table 4) | 25 |
| Nitrocellulose (a product of Daiseru Co.) | 5 |
| Coronate L (a product of Nippon Polyurethane Co.) | 5 |
| Al$_2$O$_3$ (particle size, 0.1 μm) | 6 |
| Carbon black (Ketzen black ®, a product of Lion Akzo Co., Ltd.) | 4 |

These materials were placed in a ball mill and milled together for 60 hours to prepare a uniform dispersion. This dispersion was uniformly coated onto a polyethylene terephthalate film of 75 μm in thickness so that the dry thickness was 1.5 μm, dried and hardened by allowing the film to stand at a temperature of 60° C. for 24 hours. Magnetic discs were then stamped out of the film and evaluated as a magnetic recording medium. The results are shown in Table 4.

TABLE 4

| | | Polyurethane resin | | Surface roughness (μm) | Dynamic friction coefficient | | Durability | | Void content (vol. %) |
|---|---|---|---|---|---|---|---|---|---|
| | No. | No. | Content of metal sulfonate group (equivalent/10$^6$ g) | | 5° C. | 45° C. | 5° C. | 45° C. | |
| Example No. | 26 | A | 20 | 0.021 | 0.21 | 0.23 | 20 | 18 | 4 |
| | 27 | B | 47 | 0.018 | 0.21 | 0.22 | 8 | 5 | 3 |
| | 28 | C | 85 | 0.017 | 0.19 | 0.20 | 5 | 8 | 3 |
| | 29 | D | 150 | 0.018 | 0.15 | 0.18 | 5 | 6 | 3 |
| | 30 | E | 250 | 0.018 | 0.15 | 0.17 | 5 | 7 | 4 |
| | 31 | F | 378 | 0.018 | 0.16 | 0.18 | 5 | 6 | 5 |
| | 32 | G | 495 | 0.020 | 0.18 | 0.23 | 8 | 15 | 6 |
| Comparative example No. | 16 | U | 0 | 0.098 | 0.28 | 0.32 | * | * | 15 |
| | 17 | V | 18 | 0.042 | 0.25 | 0.29 | 25 | * | 10 |
| | 18 | W | 530 | 0.037 | 0.28 | 0.29 | 31 | * | 9 |
| | 19 | X | 800 | 0.087 | 0.31 | 0.42 | * | * | 25 |

EXAMPLES 33 TO 44 AND COMPARATIVE EXAMPLES 20 TO 28

| | Part by weight |
|---|---|
| Hexagonal barium ferrite (particle size, 0.10 (μm) | 100 |
| Polyurethane resin (D) | 25 |
| Nitrocellulose (a product of Daiseru Kagaku Kogyo Co.) | 4 |
| Coronate L (a product of Nippon Polyurethane Co.) | 6 |
| Al$_2$O$_3$ (Mohs' hardness, 9; particle size, 0.1 μm) | Described in Table |
| α-Fe$_2$O$_3$ (Mohs' hardness, 6; particle size, 0.3 μm) | Described in Table |
| Brass powders (Mohs' hardness, 4; particle size, 0.2 μm) | 5 |
| Carbon black (Ketzen Black ®; a product of Lion Akzo Co., Ltd.) | 3 |

-continued

| | Part by weight |
|---|---|
| MEK | 125 |
| Toluene | 125 |
| Cyclohexane | 62 |
| n-Butylcellosolve stearate | 1.0 |
| n-Butylcellosolve palmitate | 2.0 |

These materials were treated in the same manner as in Examples 26 to 32 (Comparative examples 16 to 19) to prepare magnetic recording media which were then evaluated in the same manner as above. The results are shown in Table 5.

thane resin (G) in Table 4 was used, and evaluated in the same manner as above. The results are shown in Table 7.

COMPARATIVE EXAMPLES 41 TO 46

TABLE 5

| No. | | $Al_2O_3$ (%) | $\alpha$-$Fe_2O_2$ (%) | Brass powders (%) | Surface roughness ($\mu$m) | Dynamic friction coefficient | | Durability | | Void content (Vol. %) |
|---|---|---|---|---|---|---|---|---|---|---|
| | | | | | | 5° C. | 45° C. | 5° C. | 45° C. | |
| Example No. | 33 | 2 | 0 | 0 | 0.022 | 0.22 | 0.24 | 15 | 18 | 3 |
| | 34 | 5 | 0 | 0 | 0.018 | 0.15 | 0.18 | 5 | 8 | 3 |
| | 35 | 10 | 0 | 0 | 0.018 | 0.16 | 0.21 | 5 | 8 | 4 |
| | 36 | 20 | 0 | 0 | 0.021 | 0.17 | 0.20 | 18 | 22 | 6 |
| | 37 | 0 | 2 | 0 | 0.026 | 0.25 | 0.28 | 20 | 24 | 3 |
| | 38 | 0 | 5 | 0 | 0.022 | 0.20 | 0.21 | 6 | 8 | 4 |
| | 39 | 0 | 10 | 0 | 0.023 | 0.22 | 0.24 | 6 | 10 | 4 |
| | 40 | 0 | 20 | 0 | 0.028 | 0.20 | 0.25 | 20 | 24 | 8 |
| | 41 | 1 | 2 | 0 | 0.019 | 0.19 | 0.20 | 5 | 7 | 4 |
| | 42 | 3 | 1 | 1 | 0.018 | 0.18 | 0.18 | 6 | 8 | 4 |
| | 43 | 3 | 4 | 1 | 0.020 | 0.19 | 0.22 | 5 | 8 | 5 |
| | 44 | 5 | 0 | 1 | 0.018 | 0.18 | 0.18 | 5 | 6 | 4 |
| Comparative example No. | 20 | 0 | 0 | 3 | 0.019 | 0.28 | 0.29 | * | * | 4 |
| | 21 | 0 | 0 | 5 | 0.018 | 0.31 | 0.35 | * | * | 4 |
| | 22 | 0 | 0 | 10 | 0.023 | 0.34 | 0.41 | * | * | 6 |
| | 23 | 1 | 0 | 0 | 0.018 | 0.23 | 0.29 | 25 | * | 3 |
| | 24 | 25 | 0 | 0 | 0.028 | 0.16 | 0.18 | 35 | 38 | 12 |
| | 25 | 0 | 1 | 0 | 0.021 | 0.27 | 0.28 | * | * | 4 |
| | 26 | 0 | 22 | 0 | 0.024 | 0.19 | 0.22 | 28 | 30 | 13 |
| | 27 | 1 | 0 | 3 | 0.019 | 0.24 | 0.30 | 27 | * | 4 |
| | 28 | 22 | 0 | 5 | 0.027 | 0.32 | 0.40 | * | * | 12 |

*The amounts of $Al_2O_3$, $\alpha$-$Fe_2O_3$ and brass powders are expressed by wt. % based on hexagonal barium ferrite (this is also the same with the following tables).

EXAMPLES 45 TO 48 AND COMPARATIVE EXAMPLES 29 TO 34

Magnetic recording media were prepared in the same manner as in Examples 33 to 44 except that the polyurethane resin (A) in Table 4 was used, and evaluated in the same manner as above. The results are shown in Table 6.

EXAMPLES 49 TO 52 AND COMPARATIVE EXAMPLES 35 TO 40

Magnetic recording media were prepared in the same manner as in Examples 33 to 44 except that the polyurethane resin (V) in Table 4 was used, and evaluated in the same manner as above. The results are shown in Table 8.

COMPARATIVE EXAMPLES 47 TO 52

Magnetic recording media were prepared in the same manner as in Examples 33 to 44 except that the polyurethane resin (W) in Table 4 was used, and evaluated in the same manner as above. The results are shown in Table 9.

TABLE 6

| | | Polyurethane resin (A) | | | | | | | | |
|---|---|---|---|---|---|---|---|---|---|---|
| No. | | $Al_2O_3$ (%) | $\alpha$-$Fe_2O_3$ (%) | Brass powders (%) | Surface roughness ($\mu$m) | Dynamic friction coefficient | | Durability | | Void content (Vol. %) |
| | | | | | | 5° C. | 45° C. | 5° C. | 45° C. | |
| Example No. | 45 | 0 | 0 | 0 | 0.019 | 0.24 | 0.25 | 17 | 20 | 6 |
| | 46 | 10 | 0 | 0 | 0.021 | 0.18 | 0.20 | 8 | 10 | 8 |
| | 47 | 0 | 3 | 0 | 0.020 | 0.25 | 0.26 | 18 | 18 | 5 |
| | 48 | 0 | 10 | 0 | 0.022 | 0.19 | 0.20 | 10 | 9 | 6 |
| Comparative example No. | 29 | 0 | 0 | 3 | 0.021 | 0.35 | 0.36 | * | * | 9 |
| | 30 | 0 | 0 | 10 | 0.024 | 0.32 | 0.34 | * | * | 12 |
| | 31 | 1 | 0 | 0 | 0.018 | 0.28 | 0.30 | 32 | * | 6 |
| | 32 | 0 | 1 | 0 | 0.020 | 0.27 | 0.31 | 35 | * | 5 |
| | 33 | 25 | 0 | 0 | 0.027 | 0.19 | 0.20 | 40 | 42 | 12 |
| | 34 | 0 | 25 | 0 | 0.029 | 0.20 | 0.22 | 35 | 30 | 13 |

TABLE 7

| | | Al$_2$O$_3$ (%) | α-Fe$_2$O$_3$ (%) | Polyurethane resin (G) Brass powders (%) | Surface roughness (μm) | Dynamic friction coefficient 5° C. | 45° C. | Durability 5° C. | 45° C. | Void content (Vol. %) |
|---|---|---|---|---|---|---|---|---|---|---|
| Example No. | 49 | 3 | 0 | 0 | 0.017 | 0.20 | 0.21 | 12 | 13 | 5 |
| | 50 | 10 | 0 | 0 | 0.019 | 0.19 | 0.23 | 5 | 8 | 7 |
| | 51 | 0 | 3 | 0 | 0.018 | 0.22 | 0.22 | 16 | 18 | 6 |
| | 52 | 0 | 10 | 0 | 0.019 | 0.18 | 0.20 | 9 | 11 | 8 |
| Comparative example No. | 35 | 0 | 0 | 3 | 0.020 | 0.27 | 0.30 | * | * | 7 |
| | 36 | 0 | 0 | 10 | 0.024 | 0.29 | 0.33 | * | * | 8 |
| | 37 | 1 | 0 | 0 | 0.016 | 0.24 | 0.26 | * | * | 5 |
| | 38 | 0 | 1 | 0 | 0.016 | 0.25 | 0.29 | * | * | 5 |
| | 39 | 25 | 0 | 0 | 0.022 | 0.19 | 0.21 | 32 | 40 | 12 |
| | 40 | 0 | 25 | 0 | 0.023 | 0.20 | 0.23 | 25 | 30 | 13 |

TABLE 8

| | | Al$_2$O$_3$ (%) | α-Fe$_2$O$_3$ (%) | Polyurethane resin (V) Brass powders (%) | Surface roughness (μm) | Dynamic friction coefficient 5° C. | 45° C. | Durability 5° C. | 45° C. | Void content (Vol. %) |
|---|---|---|---|---|---|---|---|---|---|---|
| Comparative example No. | 41 | 3 | 0 | 0 | 0.026 | 0.26 | 0.30 | 28 | * | 9 |
| | 42 | 10 | 0 | 0 | 0.029 | 0.25 | 0.30 | 32 | * | 13 |
| | 43 | 0 | 3 | 0 | 0.028 | 0.28 | 0.32 | 30 | * | 10 |
| | 44 | 0 | 10 | 0 | 0.032 | 0.26 | 0.28 | 29 | * | 15 |
| | 45 | 0 | 0 | 3 | 0.032 | 0.32 | 0.35 | * | * | 12 |
| | 46 | 0 | 0 | 10 | 0.038 | 0.38 | 0.36 | * | * | 18 |

TABLE 9

| | | Al$_2$O$_3$ (%) | α-Fe$_2$O$_3$ (%) | Polyurethane resin (W) Brass powders (%) | Surface roughness (μm) | Dynamic friction coefficient 5° C. | 45° C. | Durability 5° C. | 45° C. | Void content (Vol. %) |
|---|---|---|---|---|---|---|---|---|---|---|
| Comparative example No. | 47 | 3 | 0 | 0 | 0.026 | 0.30 | 0.34 | 35 | * | 8 |
| | 48 | 10 | 0 | 0 | 0.032 | 0.28 | 0.31 | 32 | * | 12 |
| | 49 | 0 | 3 | 0 | 0.029 | 0.32 | 0.33 | * | * | 9 |
| | 50 | 0 | 10 | 0 | 0.035 | 0.30 | 0.31 | 30 | * | 15 |
| | 51 | 0 | 0 | 3 | 0.036 | 0.34 | 0.38 | * | * | 15 |
| | 52 | 0 | 0 | 10 | 0.040 | 0.34 | 0.35 | * | * | 21 |

What is claimed is:

1. A magnetic recording medium which comprises applying a magnetic layer containing (A) magnetic fine particles of plate-like hexagonal ferrite having a particle size of 0.3 μm or less and an easy axis for magnetization in the direction vertical to the flat plate surface, (B) a polyurethane resin having a metal sulfonate group of 20 to 500 equivalents/10$^6$ g of the polymer and (C) one or more members selected from the esters of C$_{10}$–C$_{18}$ fatty acids with alcohols having not more than 15 carbon atoms, the ratio of (C) to (A) being 0.1 to 20 wt. %, to a non-magnetic substrate.

2. A magnetic recording medium as claimed in claim 1, wherein the magnetic layer contains (C) and (A) in a (C):(A) weight ratio of from 1.0 to 7.0 wt. %.

3. A magnetic recording medium as claimed in claim 1, wherein the magnetic layer contains non-magnetic fine particles having a Mohs' hardness of 6 or more and a particle size of 1.0 μm or less in a weight ratio to (A) of 2 to 20 wt. %.

4. A magnetic recording medium as claimed in claim 1, wherein said magnetic recording medium is a flexible and disc-like one.

* * * * *